(12) United States Patent
Yavo et al.

(10) Patent No.: US 11,882,128 B2
(45) Date of Patent: Jan. 23, 2024

(54) IMPROVING INCIDENT CLASSIFICATION AND ENRICHMENT BY LEVERAGING CONTEXT FROM MULTIPLE SECURITY AGENTS

(71) Applicant: Fortinet, Inc., Sunnyvale, CA (US)

(72) Inventors: Udi Yavo, Herzlia (IL); Roy Katmor, San Francisco, CA (US); Ido Kelson, Tel-Aviv (IL)

(73) Assignee: Fortinet, Inc., Sunnyvale, CA (US)

( * ) Notice: Subject to any disclaimer, the term of this patent is extended or adjusted under 35 U.S.C. 154(b) by 395 days.

(21) Appl. No.: 17/023,522

(22) Filed: Sep. 17, 2020

(65) Prior Publication Data
US 2022/0086173 A1    Mar. 17, 2022

(51) Int. Cl.
*H04L 9/40*    (2022.01)
(52) U.S. Cl.
CPC ................. *H04L 63/1416* (2013.01)
(58) Field of Classification Search
CPC .................................... H04L 63/1416
USPC .......................................... 726/23
See application file for complete search history.

(56) References Cited

U.S. PATENT DOCUMENTS

| | | | | |
|---|---|---|---|---|
| 8,200,606 B2* | 6/2012 | Lorge | ...................... | G06N 5/025 |
| | | | | 706/47 |
| 9,888,029 B2* | 2/2018 | Satish | ................. | H04L 63/1433 |
| 10,027,689 B1* | 7/2018 | Rathor | ................ | H04L 63/1416 |
| 10,148,679 B2* | 12/2018 | Mulchandani | ...... | H04L 63/1425 |
| 10,389,578 B2* | 8/2019 | Achtermann | ......... | H04L 41/069 |
| 10,873,596 B1* | 12/2020 | Bourget | .................. | H04L 51/02 |
| 10,885,393 B1* | 1/2021 | Sirianni | ............. | G06F 18/2411 |
| 10,965,675 B2* | 3/2021 | Zhang | ..................... | H04L 63/08 |
| 2016/0110422 A1* | 4/2016 | Roytman | ................ | H04M 7/00 |
| | | | | 706/12 |
| 2020/0137097 A1* | 4/2020 | Zimmermann | ..... | G06F 21/6218 |
| 2021/0019215 A1* | 1/2021 | Neeter | ............. | G06Q 10/06316 |

* cited by examiner

*Primary Examiner* — Badri Narayanan Champakesan
(74) *Attorney, Agent, or Firm* — Jaffery Watson Mendonsa & Hamilton LLP (57) ABSTRACT

Systems and methods are described for synergistically combining network security technologies to improve incident classification and enrichment. According to one embodiment, an endpoint protection platform running on an endpoint device receives a request via an event management agent of the endpoint protection platform from an event management service for process information relating to an incident detected by the event management service. The request is caused to be processed by an endpoint detection and response (EDR) service by transmitting the request to an EDR agent of the endpoint protection platform corresponding to the EDR service. A response to the request is received from the EDR service via the EDR agent. The response includes the process information. Enrichment of an alert generated by the event management service based on the process information is facilitated by transmitting the response to the event management service via the event management agent.

1 Claim, 9 Drawing Sheets

IMPROVING INCIDENT CLASSIFICATION AND ENRICHMENT BY LEVERAGING CONTEXT FROM MULTIPLE SECURITY AGENTS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

FIELD

Embodiments of the present invention generally relate to the field of network security. In particular, embodiments of the present invention relate to synergistic cooperation/communication among multiple network security agents to achieve superior classification and/or enrichment capabilities on behalf of corresponding security services.

BACKGROUND

Description of the Related Art

Existing network security technologies, such as, endpoint detection and response (EDR), event management, and analytics tools, work well in their respective individual capacities and each have their own set of capabilities, with some overlap. EDR facilitates detection of attacks on endpoints and orchestration of appropriate responses. Event management systems (e.g., security information and event management (SIEM) security products) are capable of receiving alerts and/or generating alerts based on data collected collects from various security controls. Analytics tools (e.g., user entity behavior analytics (UEBA)) assist in connection with protecting enterprises from insider threats by monitoring users and endpoints and identifying potential anomalous behavior. At present, however, these network security technologies operate in silos and do not share information with each other that might be mutually beneficial.

SUMMARY

Systems and methods are described for synergistically combining network security technologies to improve incident classification and enrichment. According to one embodiment, an endpoint device includes a processing resource and a non-transitory computer-readable medium, coupled to the processing resource, having stored therein instructions that when executed by the processing resource cause the processing resource to perform alert enrichment. An endpoint protection platform running on the endpoint device receives a request via an event management agent of the endpoint protection platform from an event management service for process information relating to an incident detected by the event management service. The request is caused to be processed by an endpoint detection and response (EDR) service by transmitting the request to an EDR agent of the endpoint protection platform corresponding to the EDR service. A response to the request is received from the EDR service via the EDR agent. The response includes the process information. Enrichment of an alert generated by the event management service based on the process information is facilitated by transmitting the response to the event management service via the event management agent.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are described for synergistically combining network security technologies to improve incident classification and enrichment. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a processing resource (e.g., a general-purpose or special-purpose processor) programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "data feed" generally refers to a security event classification source or a threat intelligence sources. Non-limiting examples of data feeds include various types of endpoint protection platforms, antivirus engines, static malware analysis engines, dynamic malware analysis engines, memory forensic engines, sandboxes, User and Entity Behavior Analytics (UEBA), Intrusion Detection Systems (IDSs), content inspection engines, distributed denial of service (DDoS) mitigation engines, machine-learning malware classifiers, file threat-feeds, Internet Protocol (IP)/uniform resource locator (URL) threat feeds, Indicators of compromise (IOC) threat feeds, file reputation services, IP/URL reputation services, vulnerability discovery services, Tactics Techniques and Procedures (TTPs) feeds, security events collected from another private network, EDR data, network security devices and the like.

The phrase "endpoint protection platform" generally refers to cybersecurity monitoring and/or protection functionality implemented on an endpoint device. In one embodiment, the endpoint protection platform can be deployed in the cloud or on-premises and supports multi-tenancy. The endpoint protection platform may include a kernel-level Next Generation AntiVirus (NGAV) engine with machine learning features that prevent infection from known and unknown threats and leverage code-tracing technology to detect advanced threats such as in-memory malware. The endpoint protection platform may be deployed on the endpoint device in the form of a lightweight endpoint agent that utilizes less than one percent of CPU and less than 100 MB of RAM and may leverage, among other things, various security event classification sources provided within an associated cloud-based security service. Non-limiting examples of an endpoint protection platform include the FORTIEDR Software as a Service (SaaS) platform and the FORTICLIENT integrated endpoint protection platform available from Fortinet, Inc. of Sunnyvale, CA.

As used herein an "incident" generally refers to any malicious act or suspicious event observed within a private network. Such malicious acts typically (i) compromise or represent an attempt to compromise the logical border surrounding a network to which assets (e.g., programmable electronic devices and communication networks including hardware, software, and data) are connected and for which access is controlled or (ii) disrupt or represent an attempt to disrupt such assets. Non-limiting examples of types or classes of incidents include unauthorized attempts to access systems or data, privilege escalation attacks, unusual behavior from privileged user accounts, insider threats (e.g., insiders trying to access servers and data that isn't related to their jobs, logging in at abnormal times from unusual locations, or logging in from multiple locations in a short time frame), anomalies in outbound network traffic (e.g., uploading large files to personal cloud applications, downloading large files to external storage devices, or sending large numbers of email messages with attachments outside the company), traffic sent to or received from unknown locations, excessive consumption of resources (e.g., processing, memory and/or storage resources), changes in configuration (e.g., reconfiguration of services, installation of startup programs, the addition of scheduled tasks, changes to security rules or firewall changes), hidden files (may be considered suspicious due to their file names, sizes or locations and may be indicative that data or logs may have been leaked), unexpected changes (e.g., user account lockouts, password changes, or sudden changes in group memberships), abnormal browsing behavior (e.g., unexpected redirects, changes in browser configuration, or repeated pop-ups), suspicious registry entries, phishing attacks, malware attacks, denial-of-service (DoS) attacks, man-in-the-middle attacks, and password attacks.

In the context of an endpoint device, the term "event" generally refers to an action or behavior of a process running on the endpoint device. Non-limiting examples of events include filesystem events and operating system events. Events that may be initially classified as suspicious or malicious by a heuristic engine and/or a machine-learning engine employed by the endpoint protection platform, for example, may include an attempt to communication with a critical software vulnerability (CVE), an attempt to access the registry of the operating system, the network or the file system, an attempt by the process to copy itself into another process or program (in other words, a classic computer virus), an attempt to write directly to the disk of the endpoint device, an attempt remain resident in memory after the process has finished executing, an attempt to decrypt itself when run (a method often used by malware to avoid signature scanners), an attempt to binds to a TCP/IP port and listen for instructions over a network connection (this is pretty much what a bot—also sometimes called drones or zombies—do), an attempt to manipulate (copy, delete, modify, rename, replace and so forth) files that are associated with the operating system, an attempt to read the memory of sensitive programs, an attempt to hook keyboard or mouse (a/k/a keylogging), an attempt capture a screen shot, an attempt to record sounds, and/or other behaviors or actions that may be similar to processes or programs known to be malicious. In one embodiment, events may be detected or intercepted by the endpoint protection platform hooking filesystem and/or operating system application programming interface (API) calls of interest and/or by leveraging a hypervisor to monitor the operating system.

As used herein "indicators of compromise" or simply "indicators" generally refer to pieces of forensic data that identify potentially malicious activity on a system or network. Non-limiting examples of such data include data found in system log entries or files. Indicators of compromise may aid information security and IT professionals in detecting data breaches, malware infections, or other threat activity. By monitoring for indicators of compromise, organizations can detect attacks and act quickly to prevent breaches from occurring or limit damages by stopping attacks in earlier stages. Non-limiting examples of indicators of compromise include unusual outbound network traffic, anomalies in privileged user account activity, geographical irregularities, log-in red flags, increases in database read volume, Hypertext Markup Language (HTML) response sizes, large numbers of requests for the same file, mismatched port-application traffic, suspicious registry or system file changes, unusual DNS requests, unexpected patching of systems, mobile device profile changes, bundles of data in the wrong place, web traffic with unhuman behavior, and signs of distributed DoS (DDoS) activity.

As used herein, a "network security appliance" or a "network security device" generally refers to a device or appliance in virtual or physical form that is operable to perform one or more security functions. A network security device may reside within the particular network that it is protecting or network security may be provided as a service with the network security device residing in the cloud. Some network security devices may be implemented as general-purpose computers or servers with appropriate software operable to perform the one or more security functions. Other network security devices may also include custom hardware (e.g., one or more custom Application Specific Integrated Circuits (ASICs)). For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI-WIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

As used herein, a "super agent" generally refers to a set of cooperating security agents running on an endpoint device that are associated with respective security services. The agents may be operable to one or more of (i) communicate with their respective security services, (ii) locally apply policies configured by their respective security services, (iii) take action on network traffic, and (iv) collect and/or supply data regarding incidents, events and/or indicators. Non-limiting examples of agents that may be part of a super agent include a UEBA agent, an EM agent, an EDR agent, a network access control (NAC) agent, and a unified threat management (UTM) agent. According to various embodiments, the agents of the super agent may work synergistically with one or more of the other agents of the super agent and/or one or more other elements/components (e.g., security services and/or security functions provided by network security appliances) of a security fabric into which the elements/components are integrated, thereby enhancing network visibility and threat detection and providing a means for synchronizing a coordinated response. Non-limiting integration mechanisms by which the various agents and elements/components may communicate include Syslog messages and Representational State Transfer (REST) APIs. For example, based on configured settings, the EDR agent may be configured to send information regarding EDR security events to a configured destination server in the form of syslog messages. Alternatively, agents may be able to request information from, send information to, and/or request action to be taken by another agent or element/component via a rich set of APIs. In one embodiment, as more components/agents are installed as part of a super agent more capabilities may be unlocked. For example, some capabilities are only available when a number of agents/components are installed. Depending upon the particular implementation, the super agent may use a unified installer that can install any combination of the agents and configure them. The different agents/components are aware of another and can communicate with one another, for example, via an inter-process communication mechanism (e.g., pipes)

Figure 1A:
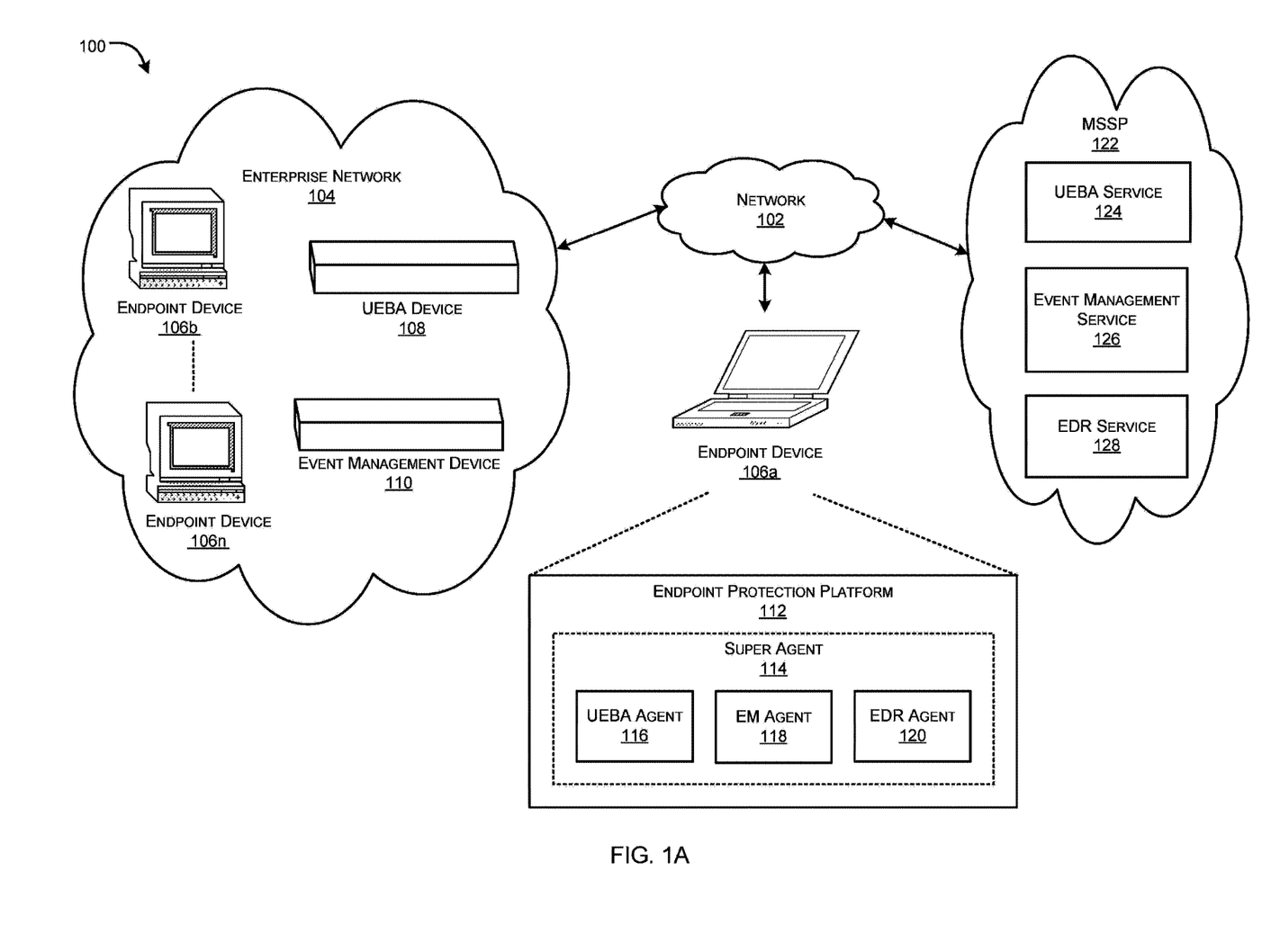
FIGS. 1A-B illustrate exemplary network architectures in accordance with an embodiment of the present invention.
Figure 1B:
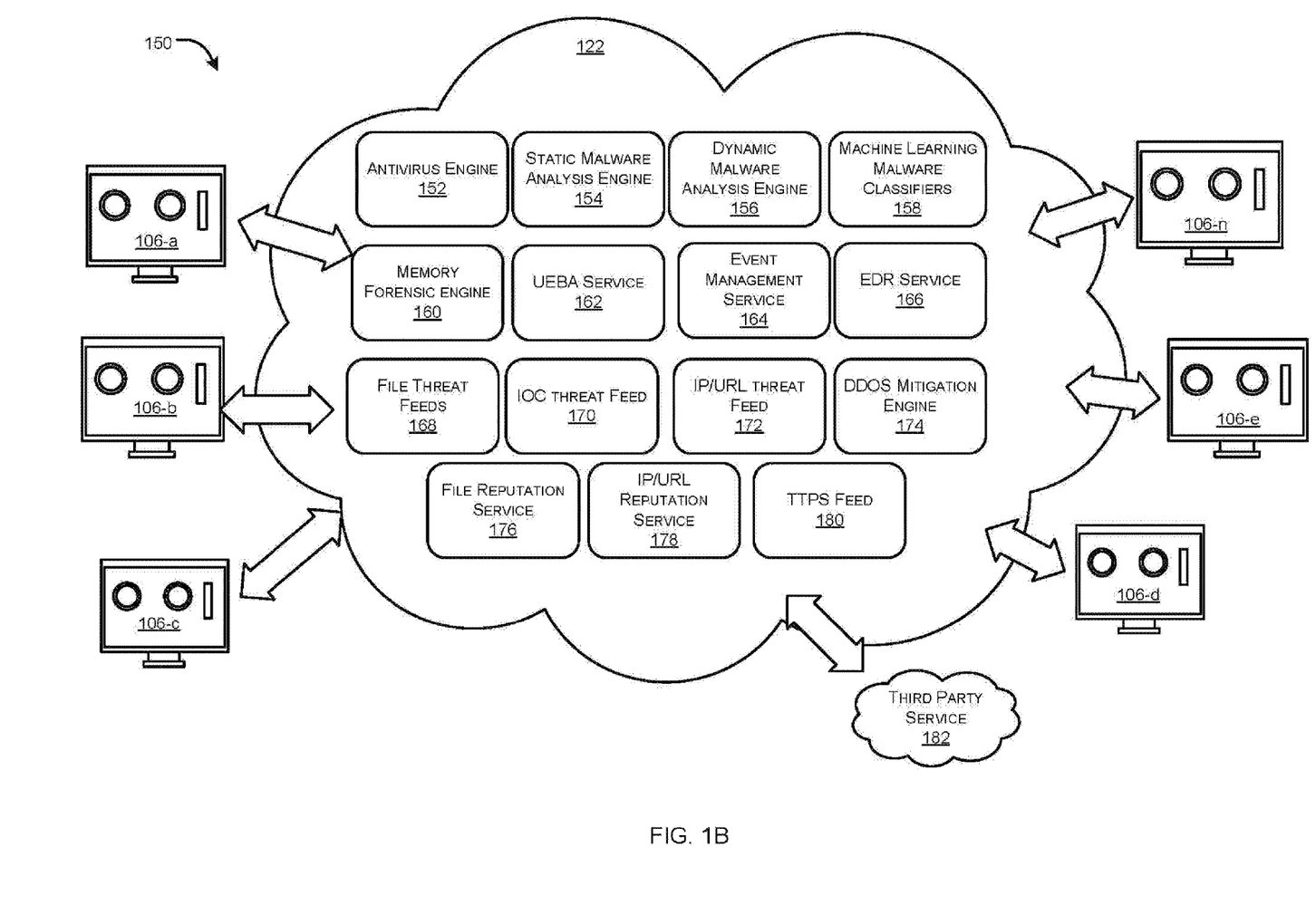

FIGS. 1A-B illustrates exemplary network architectures 100 in accordance with an embodiment of the present invention. In the context of network architecture 100, a super agent 114 is present within an endpoint protection platform 112 of an endpoint device 106-a which is connected to an enterprise network 104 via a network 102. Super agent 114 includes a user and entity behavior analytics (UEBA) agent 116, an events management (EM) agent 118, and an endpoint detection and response (EDR) agent 120. UEBA agent 116, EM agent 118, and EDR agent 120 may be communicatively coupled with corresponding security services that are implemented on-premises (e.g., in enterprise network 104) and/or in the cloud using a cloud-based security platform (e.g., managed security service provider (MSSP) 122). Each of the agents is aware of one another and may communicate with one another, for example, via an inter-process communication mechanism (e.g., a Linux or Unix pipe) supported by the operating system. In this manner, the various security services may make use of information available via one or more of the other security services by interacting via their respective agents.

In the context of the present example, enterprise network 104 includes endpoint devices 106b and 106n and a number of network security devices (e.g., a UEBA device 108 and an event management device 110) for protecting the enterprise network 104 and endpoint devices 106a-n. Endpoint devices 106a-n associated with the enterprise network 104 may be coupled in communication via network 102 with MSSP 122. The endpoint devices 106a-n (which may be collectively referred to herein as endpoint devices 106, and which may be individually referred to herein as endpoint device 106) associated with network 102 may include, but are not limited to, personal computers, smart devices, web-enabled devices, hand-held devices, laptops, mobile devices, and the like. Those skilled in the art will appreciate network 102 may be a wireless network, a wired network or a combination thereof and may be implemented as one of the various types of networks, such as an Intranet, a Local Area Network (LAN), a Wide Area Network (WAN), an Internet, and the like. Further, network 102 may either be a dedicated network or a shared network. A shared network may represent an association of the different types of networks that use a variety of protocols, for example, Hypertext Transfer Protocol (HTTP), Transmission Control Protocol/Internet Protocol (TCP/IP), Wireless Application Protocol (WAP), and the like.

In an embodiment, super agent 114 is operable within the endpoint protection platform 112 of endpoint device 106a of enterprise network 104. Super agent 114 includes multiple cooperating network security agents. The network security agents include a UEBA agent 116, an EM agent 118, and an EDR agent 120. As noted above, a security service corresponding to each of the multiple network security agents may be implemented on-premises and/or within a cloud-based security platform (e.g., MSSP 122) to which the enterprise subscribes. While not specifically illustrated in the context of the present example, those skilled in the art will appreciate the endpoint protection platform 112 and associated super agent 114 may also be running on each of endpoint devices 106b-n.

While in the context of the present example, some security services are shown implemented both on-premises and in the cloud (e.g., by MSSP 122), those skilled in the art will appreciate such security services need not be duplicated, but rather, depending upon the particular implementation, may be implemented on-premises by physical or virtual network security devices deployed within the enterprise network 104 and other security services may be implemented in the cloud, for example, by MSSP 122. For example, in one embodiment, a UEBA service and a SIEM service may be implemented on-premises by UEBA device 108 and event management device 110, respectively, while the EDR service 128 is implemented in the cloud. Those skilled in the art will appreciate depending upon the particular implementation some subset of security services corresponding to the agents 116, 118, and 120 implemented within the endpoint protection platform 112 may be implemented on-premises (e.g., by physical or virtual network security devices deployed within the enterprise network 104) or in the cloud, for example, by MSSP 122. As such, in the context of the present example, MSSP 122 is shown including a UEBA service 124, an event management service 126 and an EDR service 128 that may be used instead of or in addition to security services implemented on-premises for providing protection against threats and attacks on the enterprise network 104 and the endpoint devices 106a-n.

Various non-limiting example scenarios in which the agents 116, 118, and 120 may communicate with each other to synergistically combine information available via a variety of security services (e.g., UEBA device 108, event management device 110, UEBA service 124, event management service 126, and EDR service 128) to improve incident classification and/or enrichment are described below with reference to FIGS. 2-7.

FIG. 1B illustrates a cloud-based network architecture 150 in which various aspects may be implemented in accordance with an embodiment of the present invention. In the context of the present example, a cloud-based security service/platform (e.g., MSSP 122) implements multiple data feeds 152-180 that are capable of independently classifying a given security event, for example, by detecting malicious insider threats and collecting relevant evidence, and producing a classification result. The cloud-based security service can be used for augmenting or reclassifying an initial classification of an incident made by an endpoint protection platform (e.g., endpoint protection platform 112) protecting the endpoint device on which the process associated with the detected incident is running. Further, in some embodiments, when the revised classification of the incident is inconclusive, malicious, or suspicious, the cloud-based security service may use a UEBA-based security event classification service (e.g., UEBA 162) to augment the revised classification to produce a final classification so as to reduce false positives, for example.

Non-limiting examples of data feeds that may be used depending upon the particular implementation include various types of endpoint protection platforms (e.g., running on endpoint devices 106), an antivirus engine 152, a static malware analysis engine 154, a dynamic malware analysis engine 156 (e.g., a sandbox), machine-learning malware classifiers 158, a memory forensic engine 160, User and Entity Behavior Analytics (UEBA) service 162, a Event Management (EM) service 164, an endpoint detection and response (EDR) service 166, file threat-feeds 168, an IoC threat feeds 170, an IP/URL threat feed 172, a distributed denial of service (DDoS) mitigation engine 174, a file reputation service 176, an IP/URL reputation service 178, a TTPs feed 180, third party network services 182, and the like. Referring to architecture 150, a cloud-based security platform may include a UEBA service 162, an event management service 164, and an EDR service 166.

UEBA agents (e.g., UEBA agent 116) running on endpoint devices 106, for example, as part of an endpoint protection platform (e.g., endpoint protection platform 112) may make use of UEBA service 162 in connection with protecting the enterprise network (e.g., enterprise network 104) and the endpoint device 106 from insider threats by continuously monitoring users and endpoints with automated detection and response capabilities. According to one embodiment, the UEBA agent may make use of machine learning and advanced data analytics to automatically identify non-compliant, suspicious, or anomalous end user behavior and may alert appropriate personnel (e.g., a network administrator or the user of the endpoint device at issue) regarding the potential of a compromised user account. This proactive approach to threat detection may deliver an additional layer of protection and visibility, whether the users are on or off the corporate network.

EM agents (e.g., EM agent 118) running on endpoint devices 106, for example, as part of an endpoint protection platform (e.g., endpoint protection platform 112) may make use of event management service 164 to manage more complex endpoints, IoT, infrastructure, security tools, applications, VMs and the like, which may be constantly secured and monitored. The event management service 164, such as an SIEM service, may facilitate management of devices by providing visibility, correlation, automated response and remediation in a single, scalable solution. By using a business services view, complexity of managing network and security operations may be reduced, by freeing resources, and improving breach detection.

EDR agents (e.g., EDR agent 120) running on an endpoint devices 106, for example, as part of an endpoint protection platform (e.g., endpoint protection platform 112) may make use of EDR service 166 to deliver advanced, real-time threat protection for endpoints both for pre-infection and post-infection scenarios. EDR agents may proactively reduce an attack surface, prevent malware infections, detect and defuse potential threats in real time, and may automate response and remediation procedures with customizable playbooks. EDR technology may help enterprises to stop breaches in real-time automatically and efficiently, without overwhelming security teams with a slew of false alarms or disrupting business operations.

Figure 2:
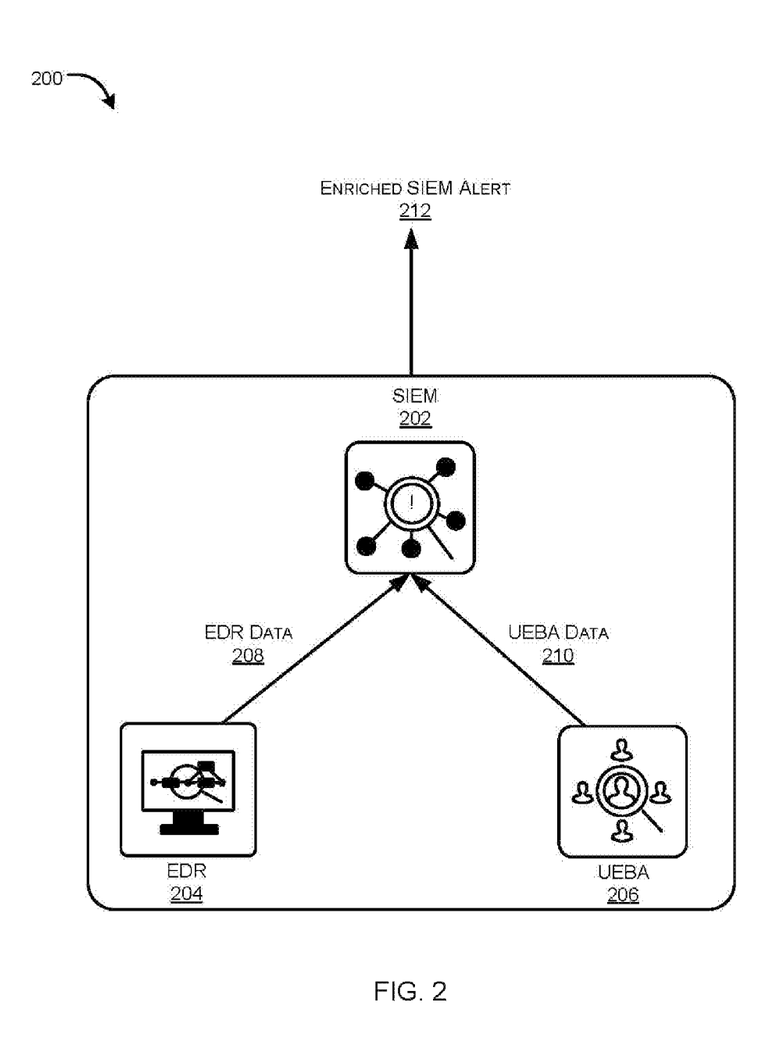
FIG. 2 is a use-case diagram illustrating interactions between SIEM, EDR, and UEBA agents that are configured as part of a super agent in accordance with an embodiment of the present invention.

FIG. 2 is a use-case diagram 200 illustrating interactions between a STEM agent 202, an EDR agent 204, and a UEBA agent 206 of a super agent (e.g., super agent 114) in accordance with an embodiment of the present invention. In a typical siloed deployment scenario, in which a SIEM service (e.g., event management device 110 or event management service 126) is not in communication with other security services (e.g., an EDR service (e.g., EDR service 128) and/or a UEBA service (e.g., UEBA device 108 or UEBA service 124)), the STEM service may receive alerts and/or generate alerts based on data collected from various different security controls. However, in the context of various examples described herein, when communication is facilitated between the STEM service and other security services, for example, via the STEM agent 202, the EDR agent 204, and the UEBA agent, the STEM service is able to provide additional supporting context relating to SIEM alerts by leveraging data collected by the EDR service and/or the UEBA service.

In the context of the present example, alerts received by and/or generated by a STEM service (e.g., event management device 110 or event management service 126) based on data collected from various different security controls may be enhanced or enriched using data or network security information received via SIEM agent 202 from an EDR service (e.g., EDR service 128) via the EDR agent 204 and/or a UEBA service (e.g., UEBA device 108 or UEBA service 128) via the UEBA agent 206.

In the context of the present example, assuming an incident (e.g., a modification to a sensitive file using a file integrity monitoring (FIN) mechanism), has been detected by the STEM service, the SIEM service may leverage the EDR service (via their respective agents) to obtain information regarding a process that changed the sensitive file. The process information may include one or more of a process identifier (PID), a process name, a time and place of occurrence of the process.

In one embodiment, upon determination of the process information, reputation information related to the process may also be determined. Additionally, suspicious activities associated with the process (e.g., from EDR data 208) may be determined and added to produce an enriched STEM alert 212. Further, the UEBA agent 106 may be used to access the UEBA service to determine how commonly/frequently the sensitive file is used in an organization. For example, information indicative of whether the sensitive file is a commonly used system file as provided by UEBA data 210 may also be added to the enriched STEM alert 212. Additionally, the STEM service (via STEM agent 202) may leverage the EDR service (via EDR agent 204) to determine whether the process is being used to access the same file on other endpoint devices. Further, this process usage information may be included within the enriched SIEM alert 212. The STEM service (via SIEM agent 202) may also leverage the UEBA service (via UEBA agent 206), and use the process and user information to determine whether the user commonly uses the process to access the file at issue. The determined process and user information (e.g., UEBA data 210) may be added to the enriched STEM alert 212. Finally, the STEM service (via STEM agent 202) may leverage the UEBA service (via UEBA agent 206) to determine whether the user regularly modifies the file at issue and may append the modification related information (e.g., returned in the form of UEBA data 210) to the enriched STEM alert 212. The enriched STEM alert 212 may then be sent and stored to the backend (e.g., the cloud-based security service/platform).

In various embodiments described herein, STEM agent 202 may produce the enriched SIEM alert 212 using one or more of EDR data 208 and UEBA data 210 received from the EDR service (via EDR agent 204) and the UEBA service (via UEBA agent 206), respectively. As an example, when the STEM service receives an alert regarding the occurrence of an incident (e.g., related to a suspicious Internet Protocol (IP)/Uniform Resource Locator (URL) connection from a firewall), the STEM service (via STEM agent 202) may request EDR data 208 and/or UEBA data 210 from the EDR service (via EDR agent 204) and the UEBA service (via UEBA agent 206), respectively, and enrich the SIEM alert 212 accordingly. The EDR data 208 may be determined and collected as EDR enrichments from the EDR agent 204, and may relate to (i) a process and/or a user that created a connection, (ii) other devices and processes that communicate to the IP/URL (the devices may be present on different Local Area Network (LANs) or outside of an organization), and/or (iii) historical information regarding connections to the IP/URL. Similarly, UEBA data 210 may be determined and collected as UEBA enrichments from the UEBA agent 206, and may relate to whether the process has an anomalous user behavior associated with the connection and/or whether any perceived anomalous user behavior fits within commonly observed behavior of other users.

In another example, when the SIEM service identifies a suspicious attachment, UEBA data 210 for use in connection with producing the enriched STEM alert 212 may be obtained from the UEBA service (via UEBA agent 206) by causing the UEBA service to determine whether the file at issue has been previously observed by one or more other endpoint devices in the enterprise and/or by determining whether the file at issue has generated security alerts in the past or is otherwise known to be malicious. Further, UEBA data 210 may be based on verifying whether the user of the endpoint device at issue and/or other users within the enterprise have used a similar file in the past.

In yet another example, the SIEM service may detect, using a file integrity monitoring (FIN) mechanism, that a sensitive file has been changed. Here, enrichments (e.g., in the form of EDR data 208 and/or UEBA data 210) may be obtained by, for example, identifying the process that changed the file, identifying related reputation information and/or suspicious activities associated with the process, by determining how common the file is in the enterprise, and/or by determining whether the file has been accessed by the process on other devices of the enterprise. UEBA data 210 may, for example, indicate whether the process at issue has been commonly used by the user, and/or a rate at which the user normally accesses the file and similar files.

In another example, when SIEM service identifies suspicious user behavior from the UEBA service (via UEBA agent 210), the STEM service (via SIEM agent 202) may request EDR enrichments (e.g., in the form of EDR data 208) from the EDR service (via the EDR agent 204). The EDR enrichments may reflect results of the EDR service determining whether one or more malware related events triggered on the endpoint device are associated with the suspicious user behavior. In another example, when the SIEM service detects a suspicious remote access tool, for example, based on the EDR service, UEBA enrichments (e.g., in the form of UEBA data 210) from the UEBA service (via UEBA agent 206) may reflect results of the UEBA service evaluating whether the use of the remote access tool is a typical user activity, for example, by the user at issue and/or by other users within the enterprise.

Figure 3:
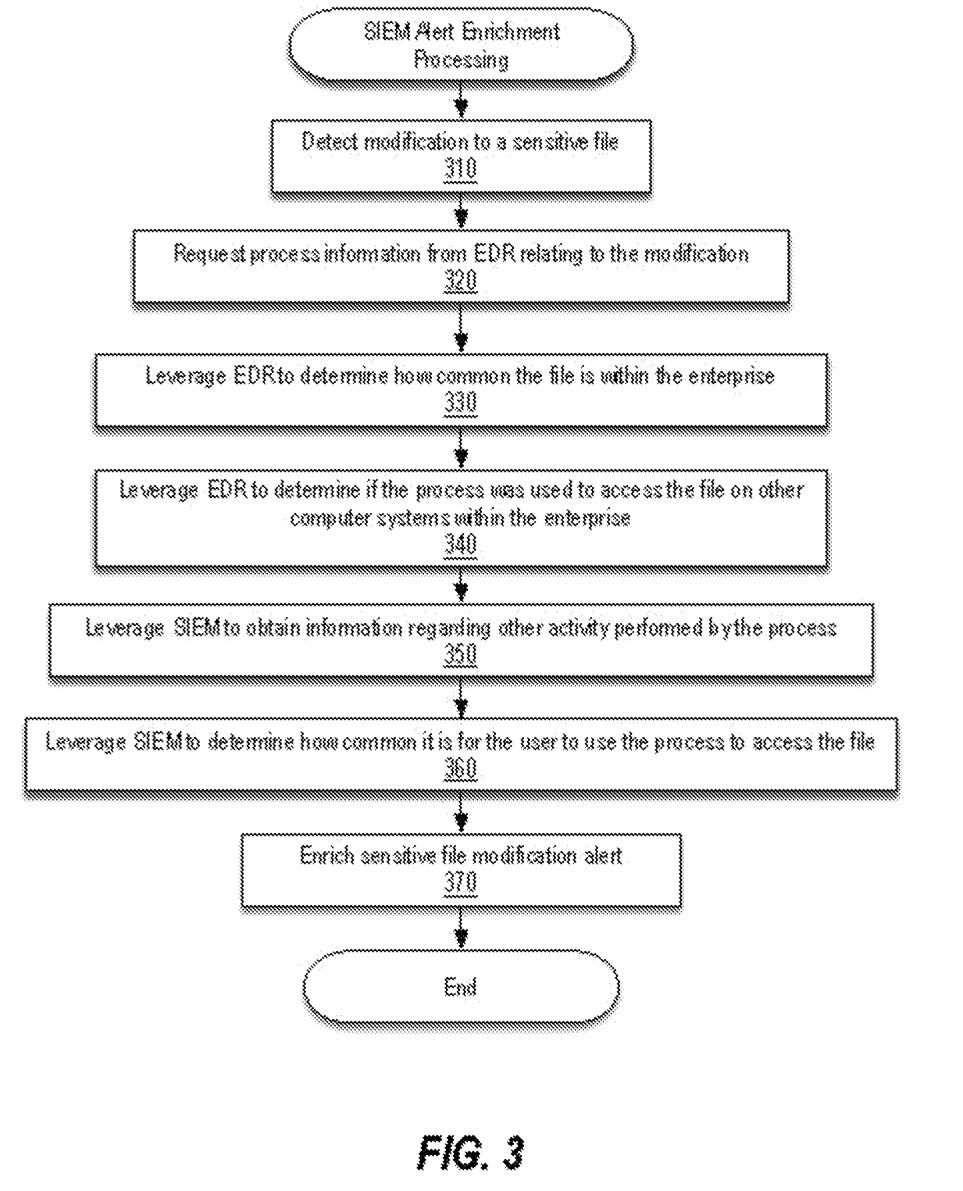
FIG. 3 is a flow diagram illustrating SIEM alert enrichment processing in accordance with an embodiment of the present invention.

FIG. 3 is a flow diagram illustrating SIEM alert enrichment processing in accordance with an embodiment of the present invention. The process described with reference to FIG. 3 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computer systems of various forms, such as the computer system 800 described with reference to FIG. 8 below.

SIEM applications are notorious for providing limited contextual information about their native events. For example, a SIEM service might show a rise in network activity from an IP address, but not the user that created that traffic or which files were accessed. Embodiments described herein seek to, among other things, fill in some of these information gaps by leveraging other sources of information.

At block 310, modification of a sensitive file may be detected by a SIEM security service. According to one embodiment the SIEM security service (e.g., event management device 110 or event management service 126) may detect the modification to the sensitive file based on file integrity monitoring performed by or on behalf of the SIEM security service. The SIEM service may maintain a database or log that correlates events gathered from various other security logs or security sources, for example, using if-then rules that add intelligence to the raw data.

At block 320, process information relating to the modification is requested from an EDR security service. According to one embodiment, the SIEM security service communicates the request to a corresponding agent (e.g., EM agent 118 or SIEM agent 202) that is part of a super agent (e.g., super agent 114) running within an endpoint protection platform (e.g., endpoint point protection platform 112) of the endpoint device associated with the event detected in block 310. The EM agent, in turn, communicates the request to the EDR security service (e.g., EDR service 128) via an agent (e.g., EDR agent 120) within the super agent corresponding to the EDR service. Response traffic may follow the reverse path from the ERD service to the ERD agent, from the EDR agent to the EM agent, and from the EM agent to the SIEM security service. According to one embodiment, the process information obtained from the EDR service may be used as an indicator and/or may be used to enrich a SIEM alert (e.g., enriched SIEM alert 212).

At block 330, the EDR service may be leveraged by the SIEM service to determine how common the file is within the enterprise. According to one embodiment, the SIEM service sends a request with information (e.g., a file name, a hash value of the file, or the entire file) identifying the file at issue to the EDR service (via their respective agents). For its part, the EDR service may maintain a database of historical information relating to files observed by the various endpoint devices and return information to the SIEM service indicative of how common the file at issue is. According to one embodiment, the information indicative of how common the file is obtained from the EDR service may be used as an indicator and/or may be used to enrich the STEM alert.

At block 340, the EDR service may be leveraged by the SIEM service to determine whether the process was used to access the file on other computer systems within the enterprise. According to one embodiment, the STEM service sends a request with process information (e.g., a PID and/or a process name) identifying the process at issue (e.g., obtained in block 320) to the EDR service (via their respective agents). For its part, the EDR service may maintain a database of historical information relating to files observed by the various endpoint devices and well as process information for processes that have interacted with the files and return information to the SIEM service indicative of a raw or normalized value indicative of a quantity of other endpoint devices within the enterprise or percentage of other endpoint devices within the enterprise that have used the same process to access the file. According to one embodiment, this information obtained from the EDR service may be used as an indicator and/or may be used to enrich the STEM alert.

At block 350, the STEM service may be leveraged to obtain information regarding other activity performed by the process. According to one embodiment, the SIEM service may use the process information obtained in block 320 to identify other events that have been logged for the process at issue. According to one embodiment, the quantity or type of other activities performed by the process may be used as an indicator and/or may be used to enrich the SIEM alert.

At block 360, the SIEM service may be leveraged to determine how common it is for the user to use the process to access the file. According to one embodiment, the SIEM service may search its database(s) to correlate accesses to the file at issue with the process information for the user at issue, for a group of users, or for all users of the enterprise. According to one embodiment, the results of this commonality analysis may be used as an indicator and/or may be used to enrich the STEM alert.

At block 370, the sensitive file modification alert is enriched. According to one embodiment, the sensitive file modification alert generated by the SIEM service is enriched based on the information obtained in one or more of blocks 320-360.

While for purposes of illustration, in the context of the present example, STEM alert enrichment processing is described with reference to a specific SIEM alert relating to a modification to a sensitive file, those skilled in the art will appreciate the methodologies described herein are equally applicable to other types of SIEM alerts. For example, abnormal behavior for a particular user may include logging into a personal device for the first time, uploading an unusual amount of data to an email website, first-time access to the Internet, access to atypical folders containing sensitive data, access to atypical files, failed login attempts, and remote desktop connection.

Figure 4:
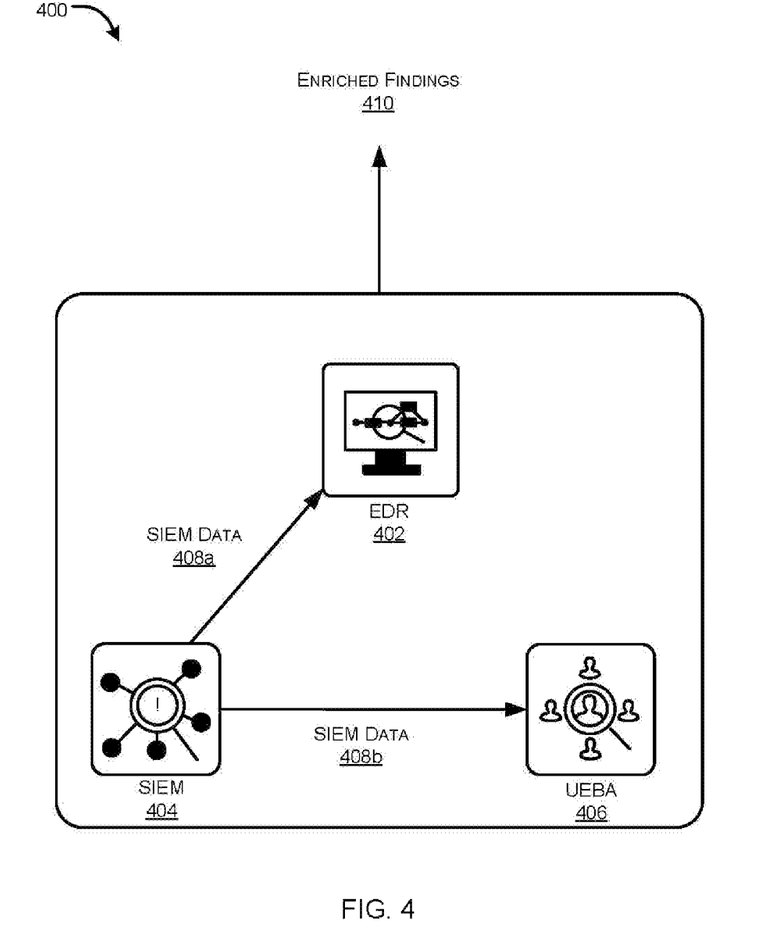
FIG. 4 is another use-case diagram illustrating interactions between SIEM, EDR, and UEBA agents that are configured as part of a super agent in accordance with an embodiment of the present invention.

FIG. 4 is another exemplary use-case diagram 400 illustrating interactions between a SIEM agent 202, an EDR agent 204, and a UEBA agent 206 of a super agent (e.g., super agent 114) in accordance with an embodiment of the present invention. In the context of the present example, an EDR service (e.g., EDR service 128) and/or a UEBA service (e.g., UEBA device 108 or UEBA service 124) may enrich their findings, notifications and alerts with extended on-demand collected SIEM data 408a and 408b.

In one embodiment, EDR service may be capable of detecting, blocking and automating incident responses for next-generation threats in real-time. As part of an incident response process, EDR service may enrich incidents with data from the STEM service to provide additional evidence for investigators to assist with decision making. For example, as part of an enrichment process, EDR service may detect and block a connection request from a suspicious process. Further, the EDR service (via EDR agent 402) may request the STEM service (via STEM agent 404) to determine whether other security controls have alerted on the connection request at issue. The STEM service may respond to the request by providing (via STEM agent 404) STEM data 408a to the EDR service (via EDR agent 402) and such information may be added to incident data to provide enriched findings 410. Additionally or alternatively, the EDR service (via EDR agent 402) may request the STEM service (via STEM agent 404) to determine whether a file associated with a suspicious process has been reported by the other security controls (e.g., mail filtering). The determined information (e.g., SIEM data 408b) related to whether the file associated with the process was reported by the other security controls may be appended to the incident data by the UEBA service to generate the enriched findings 410. The EDR service may also collect past connections from network controls to determine whether similar connections have been established or attempted to be established, and the determined information may be incorporated within the incident data to generate the enriched findings 410, which may be sent to and stored by the backend.

As additional non-limiting examples, when the EDR service detects and blocks a file associated with a suspicious process, EDR findings may be enriched, for example, by determining whether the file is considered as sensitive via its FIN controls and whether the file was alerted on, and determining whether a Data Loss Prevention (DLP) service alerted on accesses to the file and considered the file as sensitive. Similarly, when the UEBA service detects suspicious copying of files by a user, the UEBA service (via UEBA agent 406) may request information from the STEM service (via STEM agent 404) regarding the user and/or the files to enrich its findings. For example, enriched findings 410 may include information relating to results of a determination by the STEM service that another security control (e.g., DLP) alerted on access to one or more of the files at issue and considered such files to contain sensitive, confidential, and/or proprietary information. In yet another example, when the UEBA service detects a user has uploaded files to a suspicious IP address, UEBA data may be enriched upon based on a determination by the STEM service that one or more third party security controls have alerted on connections to the suspicious IP address, and/or information from network controls indicative of other users having communicated with the suspicious IP address.

While for purposes of illustration, in the context of the present example, EDR and/or UEBA processing is described with reference to specific examples relating to enrichment of findings, those skilled in the art will appreciate the methodologies described herein are equally applicable to incident classification as well. For example, the SIEM data 408a or 408b may be used to classify an incident as malicious when the STEM data 408a or 408b is indicative of alerting by other security controls on the connection in question and/or the process in question.

Figure 5:
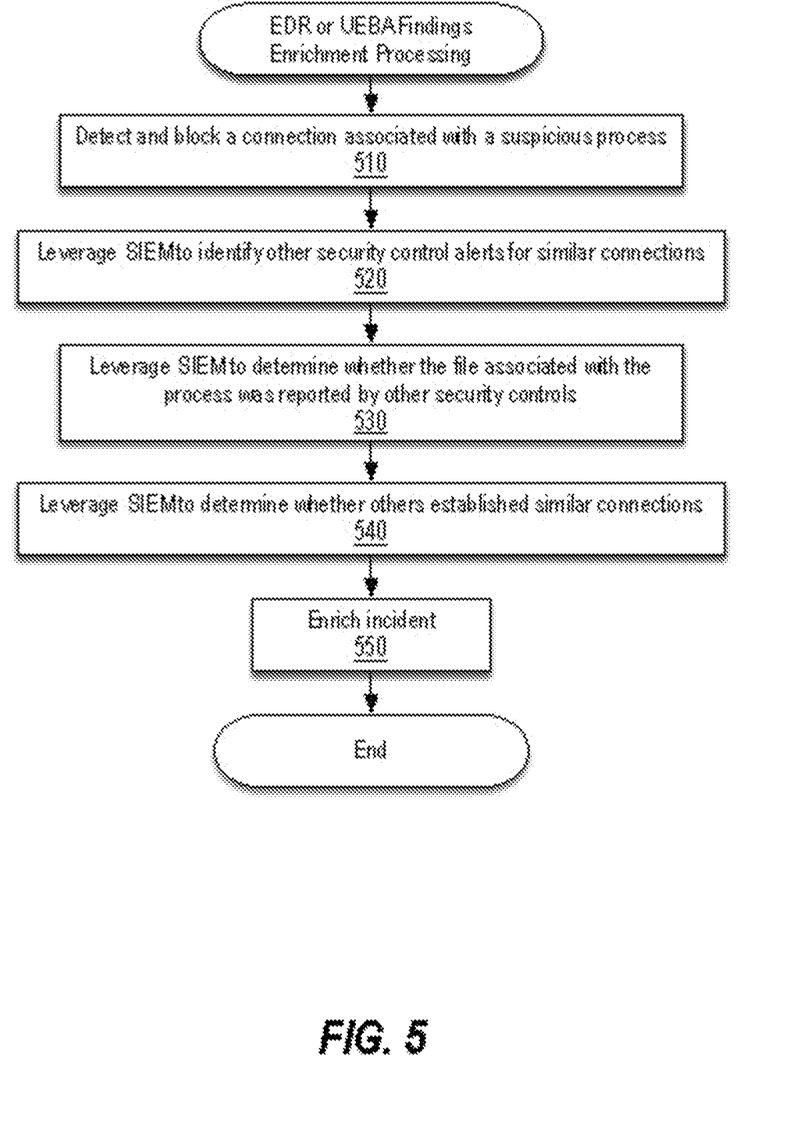
FIG. 5 is a flow diagram illustrating EDR or UEBA findings enrichment processing in accordance with an embodiment of the present invention.

FIG. 5 is a flow diagram illustrating EDR or UEBA findings enrichment processing in accordance with an embodiment of the present invention. The process described with reference to FIG. 5 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computer systems of various forms, such as the computer system 800 described with reference to FIG. 8 below.

At block 510, a connection associated with a suspicious process may be detected and blocked. According to one embodiment, the EDR service (e.g., EDR service 128) a connection originated by or directed to the endpoint device on which the endpoint protection platform (e.g., endpoint protection platform 112) is running is detected and the process to which the connection is directed or from which the connection originated is evaluated and blocked as a result of its suspicious nature.

At block 520, a SIEM service is leveraged to identify other security control alerts for similar connections. According to one embodiment, the EDR service provides information regarding the connection to the SIEM service (e.g., event management device 110 or event management service 126) and requests whether other security controls have alerted on similar connections.

At block 530, the SIEM service is leveraged to determine whether a file associated with a process representing an end point of the connection has been reported by other security controls. For example, the EDR service may provide process information and/or information identifying the file to the SIEM service concurrently with a request for information regarding other security controls that reported the process and/or the file at issue.

At block 540, the SIEM service is leveraged to determine whether others have established similar connections. For example, the EDR service may collect information and/or analysis regarding past connections from other network controls via the SIEM service.

At block 550, the incident is enriched. According to one embodiment, the incident associated with the blocked connection generated by the EDR service is enriched based on the information obtained in one or more of blocks 520-540.

Figure 6:
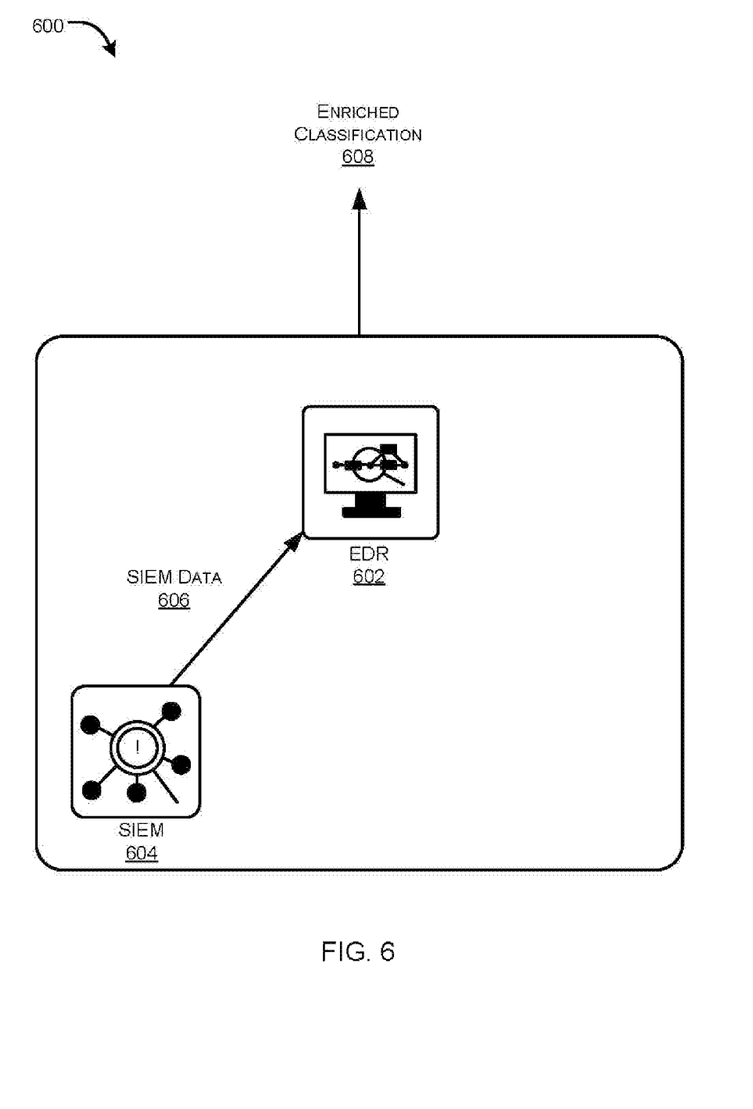
FIG. 6 is a use-case diagram illustrating interactions between SIEM and EDR agents that are configured as part of a super agent in accordance with an embodiment of the present invention.

FIG. 6 is a use-case diagram 600 illustrating interactions between SIEM and EDR agents 604 and 602 that are configured as part of a super agent (e.g., super agent 114) in accordance with an embodiment of the present invention. In the context of the present example, an EDR service (e.g., EDR service 128) may improve classification of EDR incidents using SIEM data 606 obtained via an EDR agent 602 from a corresponding SIEM service (e.g., event management device 110 or event management service 126) via a SIEM agent 604. EDR service may be capable of detecting, blocking and automating incident response of next-generation threats in real-time. As part of the incident response automation, EDR service may leverage additional data to achieve accurate classification and response to the incident. For example, data collection and/or analysis by the SIEM service may be leveraged to increase the accuracy of the incident classification. In an exemplary scenario, for an incident, EDR service may detect and block a connection from a suspicious process, and in order to improve the classification of the EDR incident, EDR service may enrich incident classification 608 using SIEM data 606 as described further below with reference to FIG. 7.

Figure 7:
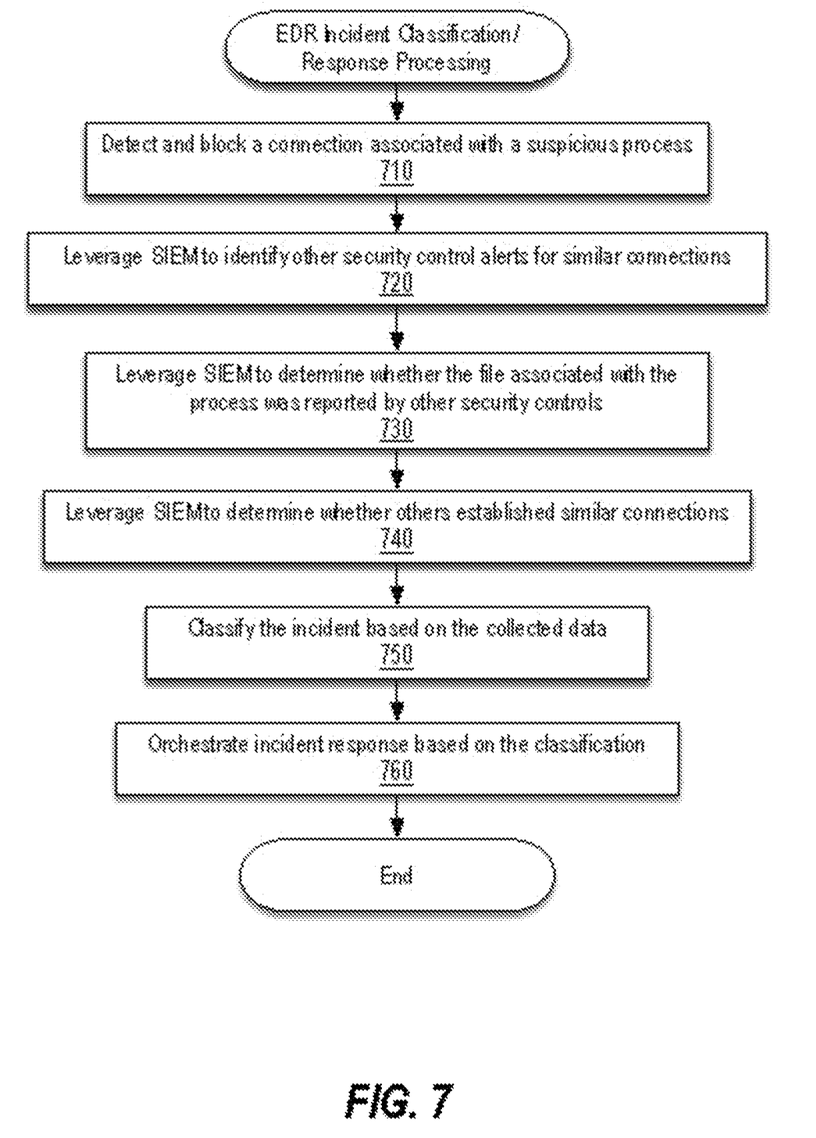
FIG. 7 is a flow diagram illustrating EDR incident classification/response processing in accordance with an embodiment of the present invention.

FIG. 7 is a flow diagram illustrating EDR incident classification/response processing in accordance with an embodiment of the present invention. The process described with reference to FIG. 7 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computer systems of various forms, such as the computer system 800 described with reference to FIG. 8 below.

At block 710, a connection associated with a suspicious process may be detected and blocked. According to one embodiment, the EDR service (e.g., EDR service 128) a connection originated by or directed to the endpoint device on which the endpoint protection platform (e.g., endpoint protection platform 112) is running is detected and the process to which the connection is directed or from which the connection originated is evaluated and blocked as a result of its suspicious nature.

At block 720, a SIEM service is leveraged to identify other security control alerts for similar connections. According to one embodiment, the EDR service provides information regarding the connection to the SIEM service (e.g., event management device 110 or event management service 126) and requests whether other security controls have alerted on similar connections.

At block 730, the STEM service is leveraged to determine whether a file associated with a process representing an end point of the connection has been reported by other security controls. For example, the EDR service may provide process information and/or information identifying the file to the SIEM service concurrently with a request for information regarding other security controls that reported the process and/or the file at issue.

At block 740, the SIEM service is leveraged to determine whether others have established similar connections. For example, the EDR service may collect information and/or analysis regarding past connections from other network controls via the SIEM service.

At block 750, the incident is classified based on the data collected from one or more other security services. According to one embodiment, a classification of an incident associated with the blocked connection generated by the EDR service is updated (e.g., from suspicious to malicious), for example, based on the information obtained in one or more of blocks 720-740.

At block 760, incident response may be orchestrated based on the classification. Non-limiting examples of incident response orchestration include termination of the process, removal of malicious files, adding firewall rules to prevent communications to a malicious IP across all devices, isolation of the device at issue, notification to a Security Operations Center (SOC), installation of an update, a patch or a bug fix to address a vulnerability exploited by the malicious process and/or removing a "backdoor" (e.g., in the form of a new user account) created by the malicious process, deletion and/or modification of registry keys in order to restore the system to its pre-infected stated, and/or alerting the end user or administrator that the malware has been stopped and allowing security teams to conduct forensics and threat hunting on their own time.

Figure 8:
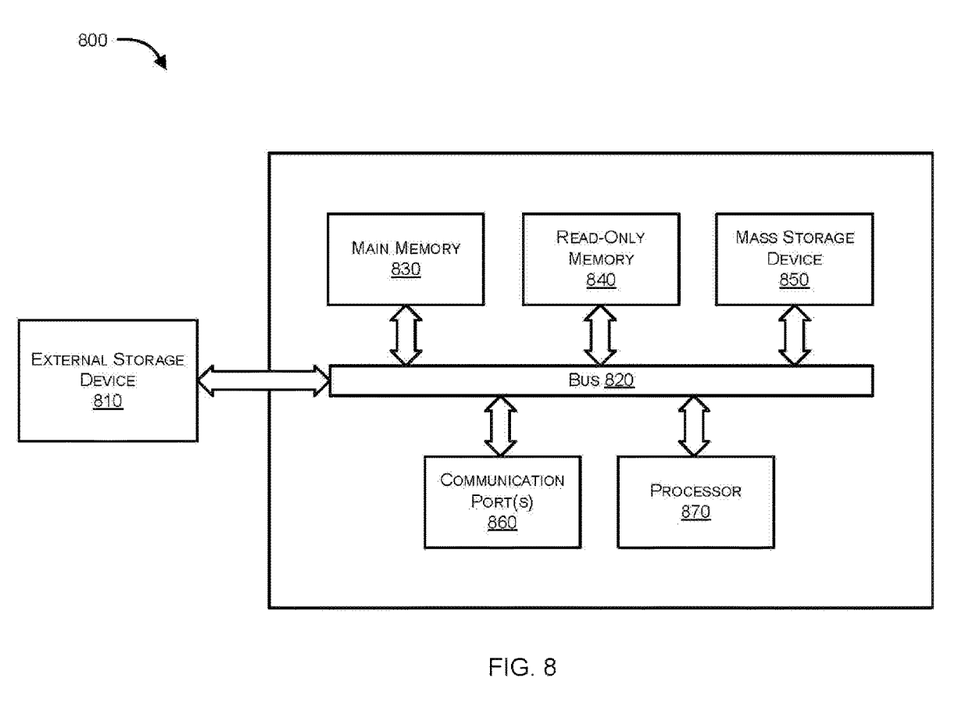
FIG. 8 illustrates an exemplary computer system in which or with which embodiments of the present invention may be utilized.

FIG. 8 illustrates an exemplary computer system 800 in which or with which embodiments of the present invention may be utilized. FIG. 8 illustrates an exemplary computer system 800 in which or with which embodiments of the present invention can be utilized. As shown in FIG. 8, computer system includes an external storage device 810, a bus 820, a main memory 830, a read only memory 840, a mass storage device 850, a communication port 860, and a processor 870. In one embodiment, computer system 800 may represent some portion of an endpoint device (e.g., endpoint device 106 of FIGS. 1A-B) or computing system supporting one of the security services described herein.

Those skilled in the art will appreciate that computer system 800 may include more than one processor 870 and communication ports 860. Examples of processor 870 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 870 may include various modules associated with embodiments of the present invention.

Communication port 860 can be any of an RS-232 port for use with a modem based dialup connection, a 10/100 Ethernet port, a Gigabit or 10 Gigabit port using copper or fiber, a serial port, a parallel port, or other existing or future ports. Communication port 860 may be chosen depending on a network, such a Local Area Network (LAN), Wide Area Network (WAN), or any network to which computer system connects.

Memory 830 can be Random Access Memory (RAM), or any other dynamic storage device commonly known in the art. Read only memory 840 can be any static storage device(s) e.g., but not limited to, a Programmable Read Only Memory (PROM) chips for storing static information e.g. start-up or BIOS instructions for processor 870.

Mass storage 850 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 820 communicatively couples processor(s) 870 with the other memory, storage and communication blocks. Bus 820 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 870 to software system.

Optionally, operator and administrative interfaces, e.g. a display, keyboard, and a cursor control device, may also be coupled to bus 820 to support direct operator interaction with computer system. Other operator and administrative interfaces can be provided through network connections connected through communication port 860. External storage device 604 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. An endpoint device, on a data communication network, for automated response to suspicious incidents, comprising:
 a processing resource;
 a network interface, communicatively coupled to the processing resource and a data communication network; and
 a non-transitory computer-readable medium, communicatively coupled to the processing resource, having stored therein instructions that when executed by the processing resource cause the processing resource to:
  detect and block a connection associated with a suspicious incident;
  identify other similar control alerts similar to the suspicious incident;

determine whether a file or a connection associated with the process was reported by other security controls, based on the similar control alerts;
determine whether other devices reported similar activity;
classify the suspicious incident based on whether the file was reported and whether other devices reported similar activity and augment the suspicious incident and reclassify an initial classification using user entity behavior analytics when initial classification of the suspicious incident is inconclusive;
enrich a notification of the suspicious incident with the classification and produce a final classification to reduce false positives; and
take an automated security remediation action based on the suspicious event classification from the enriched notification.

\* \* \* \* \*